No. 876,977. PATENTED JAN. 21, 1908.
T. LARSSON.
PLUNGER PACKING.
APPLICATION FILED MAY 31, 1904. RENEWED JUNE 20, 1907.
Fig. 1.
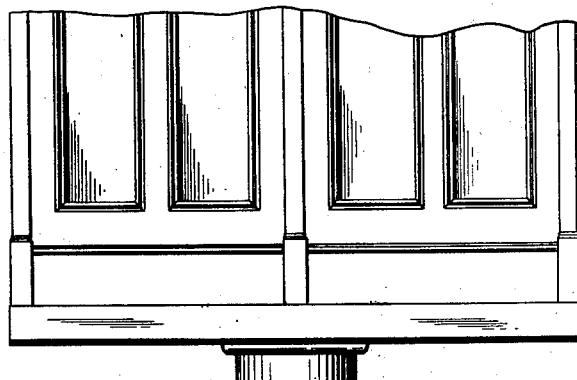
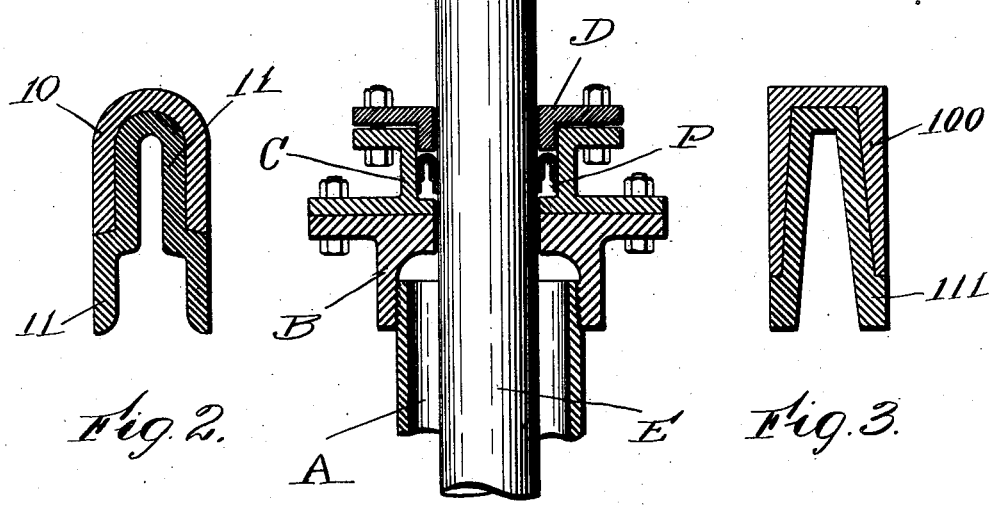
Fig. 2. Fig. 3.
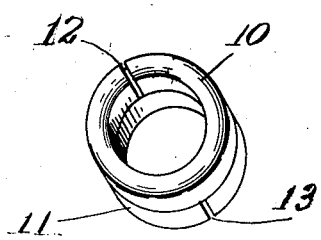
Fig. 4.
Witnesses:
C. F. Wieson
M. E. Regan
Inventor:
T. Larsson.
By his Attorneys
Southgate & Southgate

UNITED STATES PATENT OFFICE.

THURE LARSSON, OF WORCESTER, MASSACHUSETTS, ASSIGNOR TO HIMSELF, FRED A. JONES, OF WORCESTER, MASSACHUSETTS, AND WILLIAM E. D. STOKES, OF NEW YORK, N. Y.

PLUNGER-PACKING.

No. 876,977.     Specification of Letters Patent.     Patented Jan. 21, 1908.

Application filed May 31, 1904. Serial No. 210,545. Renewed June 20, 1907. Serial No. 379,925.

*To all whom it may concern:*

Be it known that I, THURE LARSSON, a subject of the King of Sweden, residing at Worcester, in the county of Worcester and State of Massachusetts, have invented a new and useful Plunger-Packing for Plunger-Elevators, of which the following is a specification.

This invention relates to a piston packing which has been designed for use in connection with the plungers of direct acting plunger elevators.

The especial object of this invention is to provide a compact, durable, inexpensive, self-adjusting piston packing which will not bind upon the elevator plunger and which will have a substantially water tight fit thereon.

To these ends, this invention consists of the piston packing as an article of manufacture and of the combinations of parts therewith as hereinafter described and more particularly pointed out in the claims at the end of this specification.

In the accompanying drawing, Figure 1 is a side view partly broken away of sufficient parts of a plunger elevator plant to illustrate the application of my invention thereto. Fig. 2 is an enlarged sectional view of the packing. Fig. 3 is a similar view illustrating a modified construction, and Fig. 4 is a detail perspective view showing the location of the joints in the packing rings.

In the use of direct acting hydraulic plunger elevators it is a matter of some difficulty to secure a water tight joint in the stuffing box through which the plunger runs. This is due to the fact that the plunger is required to be of the same length as the run of the elevator and at different points in the length of the plunger there may be slight variations in diameter.

The plunger is required to move at comparatively high speeds and it is essential that it can be operated with little friction. In addition to this the elevator stuffing box is frequently located in such position that access cannot be readily had thereto for renewal or repairs of the packing. To overcome these objections, a piston packing for an elevator plunger constructed according to this invention consists essentially of two intermeshed packing rings. The packing rings are substantially U-shaped in cross-section and these rings are arranged to break joints, the slots or cuts being preferably at the opposite sides of the stuffing box. The pressure of the water acts inside of these packing rings, the U-shaped interior of the inside packing ring preferably extending up into the upper packing ring so that the water pressure will serve to seat both rings. This pressure also causes the lower edges of the inside ring to spread sufficiently to give the necessary bearing.

Referring to the accompanying drawing and in detail, A designates the plunger casing, secured on the upper end of which is the casting B carrying a stuffing box C. Fastened in the stuffing box C is the usual gland D to hold the packing P in place. Running in the plunger casing is the ordinary elevator plunger E which carries the elevator car at its upper end. The packing P, as herein illustrated, comprises the two intermeshed packing rings 10 and 11. These packing rings are substantially U-shaped in cross-section. The joint 12 of the packing ring 10 is preferably at the opposite side of the stuffing box from the joint 13 of the packing ring 11. The open space of the elevator packing ring 11 preferably extends up inside of the upper packing ring 10 so that the pressure of water therein will tend to seat both rings and the lower part of the lower packing ring is preferably provided with shoulders to fill the entire width of the stuffing-box. By means of this construction the water pressure will cause both packing rings to have the necessary bearing and I have found in practice that a piston packing, as thus constructed, may be efficiently used in hydraulic elevator constructions.

In the construction illustrated in Figs. 1 and 2 the shape of the packing is what is used when the packing is made of leather, the leather rings preferably being bent to this shape by means of suitable presses. In some cases, however, the packing rings may be molded from rubber or other plastic material and when such materials are employed the packing rings 100 and 111 respectively may be provided with square corners, as illustrated in Fig. 3, so as to completely fill the entire space of a stuffing box.

I am aware that other changes may be made in making packings without departing from the scope of this invention as expressed in the claims.

I do not wish, therefore, to be limited to the construction I have herein shown and described, but What I do claim and desire to secure by Letters Patent of the United States is:—

1. As an article of manufacture, a piston packing for elevator plungers, comprising two intermeshed packing rings, each of a substantially inverted U-shaped section, and each of which consists of a strip having its ends substantially in contact, the joints of the respective rings being at different points on the circumference of the packing, and the open space of the inside ring extending up into the top ring so that water pressure therein will tend to seat both packings.

2. As an article of manufacture a piston packing for elevator plungers comprising two packing rings substantially U-shape in cross section, one of which is fitted inside the other, and has its opening extending up inside of the top ring, while its lower edge is extended to fill the entire width of the stuffing-box space, each of said rings consisting of a strip with the ends thereof substantially in contact, and the joints of the respective rings being at different points around the circumference of the packing.

In testimony whereof I have hereunto set my hand, in the presence of two subscribing witnesses.

THURE LARSSON.

Witnesses:
　LOUIS W. SOUTHGATE,
　PHILIP W. SOUTHGATE.